(12) United States Patent
Tomsio et al.

(10) Patent No.: US 6,737,902 B2
(45) Date of Patent: May 18, 2004

(54) METHOD AND A SYSTEM TO DISTRIBUTE CLOCK SIGNALS IN DIGITAL CIRCUITS

(75) Inventors: Nayon Tomsio, Austin, TX (US); Avi Liebermensch, Cupertino, CA (US); Harsh D Sharma, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/147,757

(22) Filed: May 16, 2002

(65) Prior Publication Data

US 2003/0214340 A1 Nov. 20, 2003

(51) Int. Cl.[7] .................................................. G06F 1/04
(52) U.S. Cl. ........................ 327/293; 327/295; 327/565
(58) Field of Search ................................ 327/295, 292, 327/293, 297, 565

(56) References Cited

U.S. PATENT DOCUMENTS

| | | | |
|---|---|---|---|
| 5,416,918 A | * 5/1995 | Gleason et al. ............ 713/501 |
| 5,691,662 A | * 11/1997 | Soboleski et al. .......... 327/292 |
| 5,914,963 A | 6/1999 | Basile |
| 5,949,262 A | * 9/1999 | Dreps et al. ................ 327/156 |
| 6,340,905 B1 | 1/2002 | Schultz |
| 6,433,606 B1 | * 8/2002 | Arai ........................... 327/291 |
| 6,525,587 B2 | * 2/2003 | Makino ...................... 327/292 |
| 6,536,024 B1 | * 3/2003 | Hathaway ...................... 716/6 |

* cited by examiner

Primary Examiner—Timothy P. Callahan
Assistant Examiner—Cassandra Cox
(74) Attorney, Agent, or Firm—Zagorin, O'Brien & Graham LLP

(57) ABSTRACT

Provided are a method and a system to distribute clock signals in digital circuits to ensure that the multiple clock signals reach multiple loads associated with the digital circuit, concurrently. To that end, an off-chip set of clock paths, which includes one or more clock buffers, are connected between two sets of clock paths on an integrated digital circuit. The multiple clock signals are routed to the off-chip set of clock paths to reduce, or remove, propagational delay in multiple clock signals that arise from the propagation of the same through the on-chip clock paths. This is achieved by the clock paths of the off-chip set of clock paths having differing resistivities, differing lengths or both.

20 Claims, 3 Drawing Sheets

METHOD AND A SYSTEM TO DISTRIBUTE CLOCK SIGNALS IN DIGITAL CIRCUITS

The present invention concerns digital electronics and more particularly, to a method and a system to distribute clock signals in digital circuits.

A majority of digital circuits include pipelined systems, finite-state machines or a combination thereof. Storage elements incorporated in the pipelined systems and the finite-state machines are usually defined in terms of a set of clock waveforms used to control storage operations of each storage element.

For example, FIG. 1 shows an exemplary digital circuit, such as a Finite State Machine (FSM) 10. FSM 10 includes combinational logic 12 having one or more inputs 14 and one or more outputs 16. Some of the outputs, shown as 16a, are in electrical communication with some of the inputs, shown as 14a, through a storage element, shown as a register 18. Register 18 is clocked by one or more system clocks 20, which time the operation of FSM 10. FSM 10 operates by determining the "next state" of register 18 as a function of the "current state" of register 18 and the state at input 14. The state at outputs 16 are a function of the "current state" of registers 18 and the state at inputs 14. Upon the sensing of a clock transition at CLK input, bits associated with the "next state" propagate from output 16a to $D_{input}$ of register 18. Bits associated with the "current state" propagate from $Q_{output}$ to input 14a. Next state bits replace current state bits, and the "current state" bits are operated on by the combinational logic 12 to progress to outputs 16 and 16a. When the state of outputs 16 and 16a are stable, FSM 10 may be clocked again. The time required for state stabilization defines the maximum frequency that FSM 10 may operate.

FIG. 2 shows a pipelined system 22 that employs logic circuits 24a and 24b, as well as storage elements, e.g., registers 26a, 26b and 26c. Registers 26b and 26c receive the $Q_{output}$ of logic circuits 24a and 24b, respectively, during each clock cycle that is sensed by clock input CLK. Unlike FSM 10, shown above in FIG. 1, no feedback is incorporated in pipelined system 22, of FIG. 2.

Considering the dependence of digital circuits on a clock for proper operation, the importance of selecting a suitable clocking scheme becomes manifest. For example the clocking scheme, in part, dictates how many clock signals need to be routed throughout the digital circuit, as well as the configuration and design of the storage elements, e.g., how many transistors may be employed to fabricate the same. As a result, the clocking scheme impacts the size of, and the power dissipated by, the digital circuit.

Another consideration when selecting a suitable clocking scheme ensures that clock signals satisfy hold time and setup constraints. The hold time relates to a period of delay between a clock input to the register and the storage element in the registers. Data should be held during this period while the clock travels to the point of storage. The setup time is a period of delay between data input of the register and the storage element in the register. As the data takes a finite time to travel to the storage point, the clock should not change until the correct data value appears. Failure to satisfy the hold-time and setup constraints may result in erroneous data being stored in registers.

This can be problematic when synchronizing clock signals distributed to multiple storage elements, as in the case of a distributed-clock-tree scheme, shown in FIG. 3. The distributed-clock-tree scheme consists of a tree 30 of clock-buffers 32 with suitable geometry such that registers, shown as 34 and 36 receive well-regulated clock signals. However, RC delay in the clock path and/or delays in the clock-buffers, shown generally as $delay_1$ and $delay_2$, may cause clock signals to arrive at registers 34 and 36 asynchronously, referred to as clock skew.

Clock skew may cause both hold-time and setup violations. Assuming no delay is introduced by digital logic 38, the earliest that data appears at input $D_{input}$ of register 36 is at time $Delay_1 + Delay_{Qoutput}$, where $Delay_{Qoutput}$ is the delay introduced by register 34. The clock is sensed by CLK input of register 36 at time $T_{c2}$. Assuming zero internal setup and hold times in the registers, were $T_{c2}$ greater than $T_{c1}$, where $T_{c1} = Delay_1 + Delay_{Qoutput}$, register 36 would store data from the current cycle rather than the previous cycle. This is a hold-time violation. Were $T_{c2}$ less than $T_{c1}$, data would arrive late at $D_{input}$ of register 36. This results in a setup-time violation.

A need exists, therefore, to provide a method and a system to distribute clock signals to a digital circuit that minimizes clock skew.

SUMMARY OF THE INVENTION

The present invention provides a method and a system to distribute clock signals in digital circuits to ensure that multiple clock signals reach multiple loads associated with the digital circuit, concurrently. To that end, an integrated digital circuit is provided having first and second sets of clock paths. The integrated digital circuit is mounted to a substrate that has a third set of clock paths. The multiple clock signals propagate through the first set of clock paths. One of the multiple clock signals is delayed with respect to the remaining clock signals, defining a propagational delay. The multiple clock signals are routed to the third set of clock paths contained on the substrate, defining routed clock signals. The third set of clock paths are configured to reduce, if not remove, the propagational delay in the routed signals that may result from the multiple clock signals propagating through the first or second sets of clock paths. To that end, the third set of clock paths are formed to have differing resistivities. This may be achieved by providing the clock paths of the third set with different lengths, different width or formed from differing materials, e.g., copper and aluminum. The routed clock signals propagating along the third set of clock paths are inputted to the second set of clock paths contained on the integrated digital circuit. The multiple loads of the integrated digital circuit are connected to receive the routed clock signals propagating along the second set of clock paths. In addition to minimizing delay between clock signals reaching the multiple loads, the advantages of coupling and decoupling the clock signals to clock paths on the substrate are manifold. Firstly, the number of clock paths, as well as clock buffers, required by the integrated digital circuit may be reduced. This reduces the number of elements that may introduce propagational delay and, therefore, clock skew. In addition, the dimensional tolerances for clock paths on the substrate are more relaxed than the dimensional tolerances for clock paths on the integrated digital circuit, while maintaining similarly, if not identical, operational characteristics. As a result, the cost associated with correcting propagational delays in clock signals is greatly reduced by reducing the same in the clock paths on the substrate.

DETAILED DESCRIPTION OF THE PREFERRED EMBODIMENTS

Figure 1:
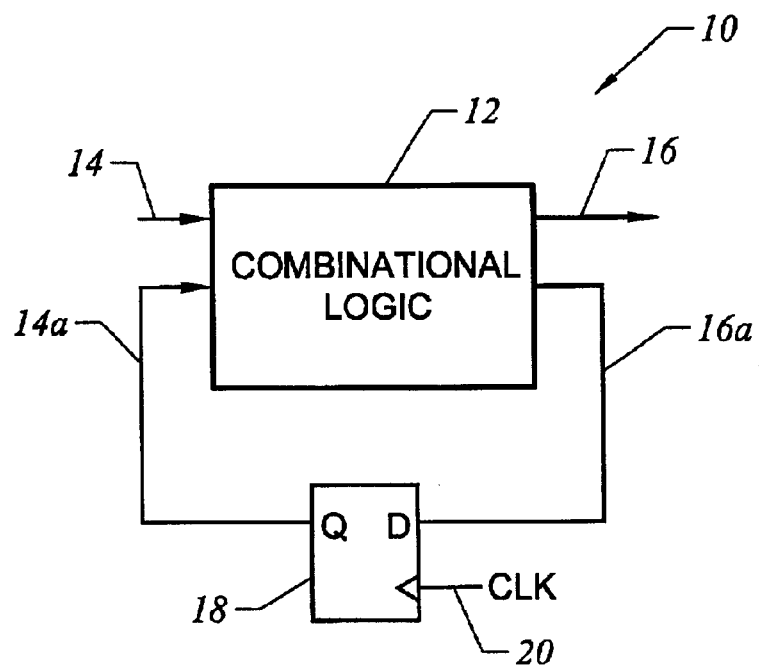
FIG. 1 is a simplified plan view of a prior art finite state machine in which the present invention may be employed.
Figure 2:
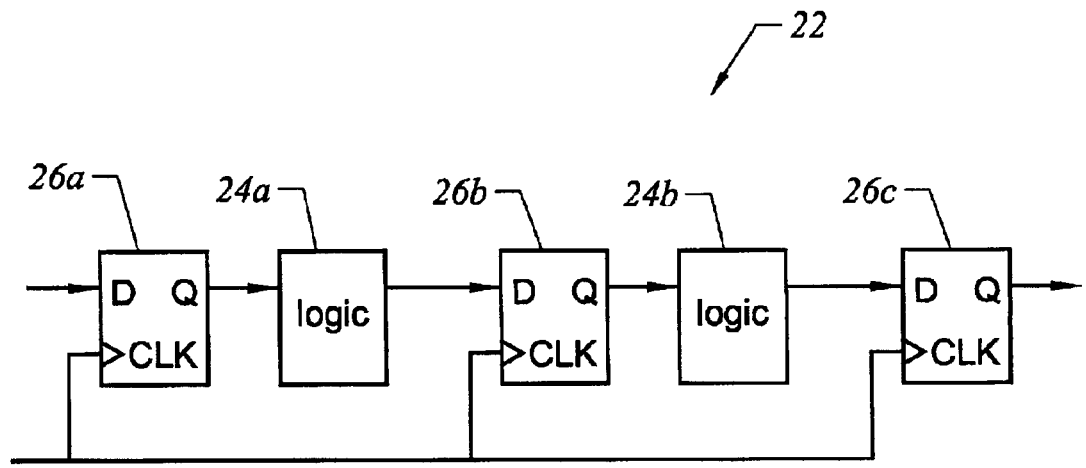
FIG. 2 is a simplified plan view of a prior art digital circuit in which the present invention may be employed.
Figure 3:
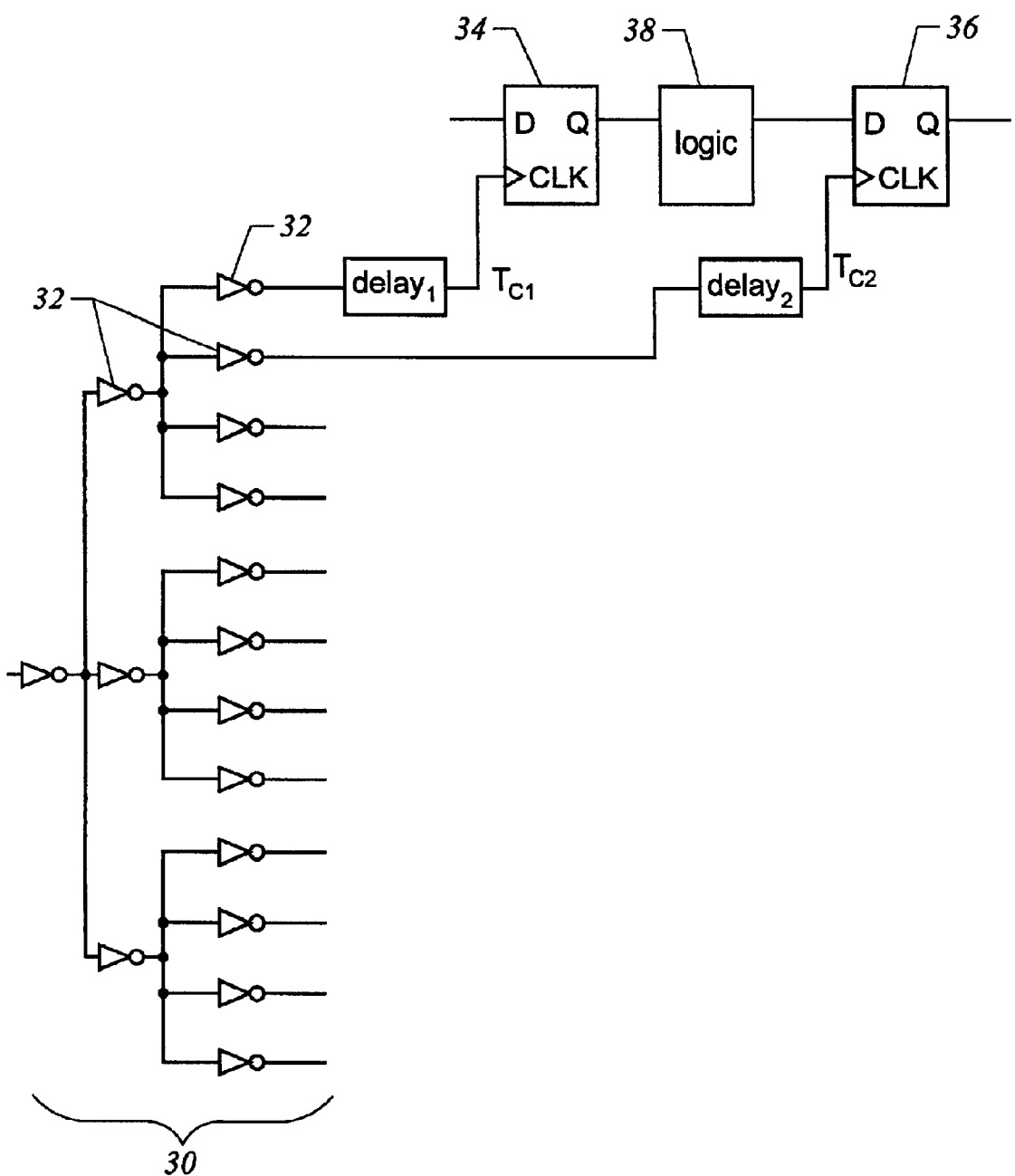
FIG. 3 is a simplified plan view of a clock tree structure in which multiple clock signals are sensed by a digital circuit in accordance with the prior art.
Figure 4:
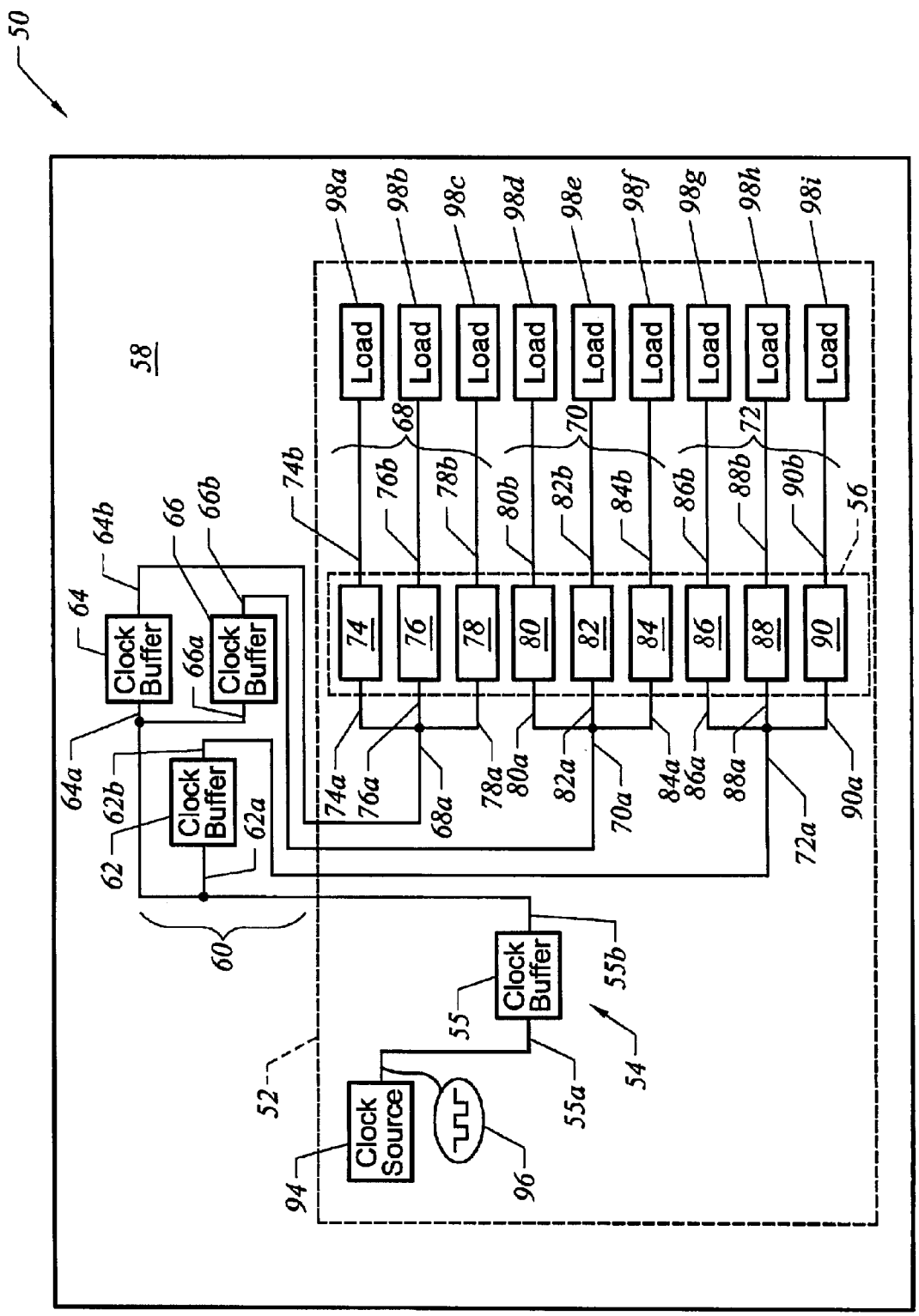
FIG. 4 is a plan view showing routing of clock signals in accordance with the present invention.

Referring to FIG. 4, shown is a digital system 50 that includes an integrated digital circuit 52 having first and second sets of clock paths, 54 and 56, respectively. First set of clock paths 54 are in electrical communication with second set of clock paths 56. Integrated digital circuit 52 is mounted to a substrate 58 using any suitable means known in the art. Substrate 58 includes a third set of clock paths 60 that are in electrical communication with first and second set of clock paths 54 and 56.

Each of first, second and third sets of clock paths 54, 56 and 60 includes one or more clock buffers. As shown, first set of clock paths 54 includes a single clock buffer 55, having an input 55*a* and an output 55*b*. Third set of clock paths 60 includes three clock buffers 62, 64 and 66 having an input 62*a*, 64*a* and 66*a*, respectively. Each of inputs 62*a*, 64*a* and 66*a* are connected in common to output 55*b* defining a conductive path therebetween. Each of clock buffers 62, 64 and 66 includes an output 62*b*, 64*b* and 66*b*, respectively. Each of outputs 62*b*, 64*b* and 66*b* are connected to a subgroup 68, 70 and 72 of clock paths of second set of clock paths 56. Each subgroup 68, 70 and 72 differs from the other subgroups. Specifically, output 62*b* is connected to input 72*a*, of subgroup 72. Output 64*b* is connected to input 68*a* of subgroup 68, and output 66*b* is connected to input 70*a* of subgroup 70. In this manner, each of subgroups 68, 70 and 72 are uniquely associated with one of outputs 62*b*, 64*b* and 66*b*.

Each of subgroups 68, 70 and 72 includes a plurality of clock buffers. As shown, subgroup 68 includes clock buffers 74, 76 and 78. Clock buffers 74, 76 and 78, have inputs 74*a*, 76*a* and 78*a* connected in common to input 68*a*. Clock buffers 74, 76 and 78, have outputs 74*b*, 76*b* and 78*b*. Subgroup 70 includes clock buffers 80, 82 and 84. Clock buffers 80, 82 and 84, have inputs 80*a*, 82*a* and 84*a* connected in common to input 70*a*. Subgroup 72 includes clock buffers 86, 88 and 90. Clock buffers 86, 88 and 90, have inputs 86*a*, 88*a* and 90*a* connected in common to input 72*a*.

Included on integrated digital circuit 52 are one or more clock sources, one of which is shown as 94. Clock source 94 produces clock signals 96 that are employed to synchronize the operations of integrated digital circuit 52. Specifically integrated digital circuit 52 may perform various logical functions, such as AND, or, NAND functions. To that end, integrated digital circuit 52 includes a plurality of loads 98*a–i*, each of which is connected to receive a clock signal from one of outputs 74*b*, 76*b*, 78*b*, 80*b*, 82*b*, 84*b*, 86*b*, 88*b* and 90*b*.

Clock signal 96 is transmitted to loads 98*a–i* through first, second and third sets of clock paths 54, 56 and 60. Specifically, clock signal 96 is received at input 55*a* of clock buffer 55. Upon exiting clock buffer 55 at output 55*b*, clock signal 96 is transmitted to third set of clock paths 60 which are sensed by inputs 62*a*, 64*a* and 66*a*, respectively. Each clock signal at inputs 62*a*, 64*a* and 66*a* is transmitted to second set of clock paths 56 as multiple signals so that each of inputs 74*a*, 76*a*, 78*a*, 80*a*, 82*a*, 84*a*, 86*a*, 88*a* and 90*a* senses a clock signal that is transmitted to outputs 74*b*, 76*b*, 78*b*, 80*b*, 82*b*, 84*b*, 86*b*, 88*b* and 90*b*, respectively.

A problem to overcome with the present configuration of digital system 50 is the reduction of a difference in propagation delay with respect to one or more of clock signals propagating between first set of clock paths 54 and one of loads 98*a–i*. As is well known in the digital electronics art, a delay between one or more of the multiple clock signals propagating to loads 98*a–i* results in clock skew. Clock skew may cause deleterious effects in the operations of integrated digital circuit 52, including loss of data. The aforementioned difference in propagation delay between the clock signals may result from various physical and electrical parameters of the integrated digital circuit 52, process used to form transistors included in digital circuit 52, as well as slight variations in path length between inputs 62*a*, 64*a*, 66*a* and loads 98*a–i*. Other causes may be slight variations in the operational speed of clock buffers 62, 64, 66, 74, 76, 78, 80, 82, 84, 86, 88 and 90 due to design and environmental fluctuations, such as voltage and temperature variations at clock buffers 62, 64, 66, 74, 76, 78, 80, 82, 84, 86, 88 and 90.

It was found that by providing one or more clock paths 54, 56 and 60 of clock buffers 62, 64, 66, 74, 76, 78, 80, 82, 84, 86, 88 and 90, off-chip, i.e., not on integrated circuit 52, such as by the presence of third set of clock paths 60, clock skew may be greatly reduced. To correct differences in propagation delays between the clock signals, various approaches may be taken. For example, the conductive paths between inputs 62*a*, 64*a*, and 66*a* and outputs 62*b*, 64*b*, and 66*b* may be provided with different lengths to compensate for propagation delays in either first or second sets of clock paths 54 and 56. Alternatively, or in addition to the conductive paths extending between input 60*a* and output 60*b* may be provided with differing resistivities to compensate for propagation delay. For example, the dimensions of the conductive paths may be changed to control the resistivity of the same, with wider conductive paths being less resistive compared to narrower resistive paths. Alternatively, or in addition to varying the dimensions of the conductive paths, the resistivity of the same may be varied by the material from which the conductive paths are formed. Some of the conductive paths may be formed from aluminum while other conductive paths may be formed from less resistive copper and/or gold.

The presence of third set of clock paths 60 obviates the need for one set of clock paths and one integrated digital circuit 52. As a result, the numbers of clock buffers that must be provided on integrated digital circuit 52 are reduced, thereby reducing temperature variation and voltage variations experienced by the remaining clock buffers. This reduces the probability of clock skew by reducing the probability and/or magnitude of any propagational delay between any of the clock signals 96 propagating through first and second sets of clock paths 54 and 56.

Moreover, replacing one set of clock paths on integrated digital circuit 52 with an off-chip set of clock paths reduces the occurrence of introducing propagation delay due to the different design tolerances afforded by the differing technologies. For example, design tolerances of integrated digital circuit 52 often necessitate a tolerance of 10% of the width of the conductive path, or less. Clock paths on substrate 58, on the other hand provide a 50% reduction in tolerance, while affording the same electrical performance. Specifically, such conductive paths may have a tolerance of 15% of the width of the conductive path or less. In this manner, the clock skew of the digital system 50 may be improved by simply replacing one or more of the clock paths 54, 56 and 60 on integrated digital circuit 52 with one or more off-chip clock paths. Additional benefits provided are reduced power consumption and integrated digital circuit production cost. Of course, a trade-off exists with respect to the amount of real-estate available on substrate 58.

Although the foregoing has been discussed with respect to a clock tree structure, it should be understood that the present invention may be employed in other clock distribution schemes providing the benefits mentioned above by abrogating one or more layers of clock paths from the integrated digital circuit. In addition, the present invention may be employed in a phase lock loop clock distribution scheme employed to synchronize data transfer between two or more integrated digital circuits. Thus, the embodiments of the present invention described above are exemplary and the scope of the invention should, therefore, be determined not with reference to the above description, but instead should be determined with reference to the appended claims along with their full scope of equivalents.

What is claimed is:

1. A method to distribute one or more clock signals to multiple loads associated with an integrated digital circuit having first and second sets of clock paths and mounted to a substrate having a third set of clock paths, each of the first set of clock paths, the second set of clock paths, and the third set of clock paths including at least one clock path, said method comprising:

propagating said one or more clock signals through said first set of clock paths on said integrated digital circuit;

routing said one or more clock signals to said third set of clock paths contained on said substrate, defining routed clock signals; and inputting said routed clock signals to said second set of clock paths contained on said integrated digital circuit, with said multiple loads being connected to receive said routed clock signals propagating along said second set of clock paths.

2. The method as recited in claim 1 further including providing in at least one of said first, second and third sets of clock paths, a plurality of buffers.

3. The method as recited in claim 1 further including adjusting at least one of said routed clock signals to reduce a difference in propagation delay between said routed clock signals to ensure said routed clock signals arrive at respective ones of said multiple loads, concurrently.

4. The method as recited in claim 1 further including configuring said third set of clock paths to reduce a difference in propagation delay between the one or more clock signals upon arrival at respective loads.

5. The method as recited in claim 1 further including configuring said third set of clock paths to reduce a difference in propagation delay between said one or more clock signals by providing a subgroup of the clock paths associated with said third set of clock paths with a resistivity that differs from the resistivity associated with said remaining clock paths of said third set of clock paths.

6. The method as recited in claim 1 further including configuring said third set of clock paths to reduce a difference in propagation delay between said one or more clock signals by varying a length of one or more of said clock paths included in said third set of clock paths relative to another of said clock paths included in said third set of clock paths.

7. The method as recited in claim 1 further including configuring said third set of clock paths to reduce a difference in propagation delay between said one or more clock signals by varying a width of at least one clock path of said third set of clock paths.

8. The method as recited in claim 1 further including configuring said third set of clock paths to reduce a difference in propagation delay between said one or more clock signals by forming one of said clock paths associated with said third set of clock paths of material having resistivity associated therewith that differs from the resistivity associated with the material from which said remaining clock paths of said third set of clock paths are formed.

9. The method as recited in claim 1 further including splitting each of said one or more clock signals into a plurality of clock signals, defining an augmented set of clock signals and propagating said augmented set of clock signals along said second set of clock paths wherein routing said one or more clock signals further includes routing said augmented set of clock signals to said third set of clock paths contained on said substrate.

10. A method to distribute one or more clock signals to multiple loads associated with an integrated digital circuit having first and second sets of clock paths and mounted to a substrate having a third set of clock paths, each of the first set of clock paths, the second set of clock paths, and the third set of clock paths including at least one clock path, said method comprising:

propagating said one or more clock signals through said first set of clock paths on said integrated digital circuit;

splitting said one or more clock signals into a plurality of clock signals, defining an augmented set of clock signals;

routing said augmented set of clock signals to said third set of clock paths contained on said substrate, defining a routed set of clock signals;

inputting said routed set of clock signals to said second set of clock paths contained on said integrated digital circuit, with said multiple loads being connected to receive said routed set of clock signals propagating along said second set of clock paths; and adjusting at least one clock signal of said routed set of clock signals to reduce a difference in propagation delay between said one or more clock signals to ensure said routed set of clock signals arrive at each of said multiple loads, concurrently.

11. The method as recited in claim 10 wherein adjusting said routed set of clock signals further includes configuring said third set of clock paths to reduce said difference in propagation delay by providing one or more of the clock paths associated with said third set of clock paths with a resistivity that differs from the resistivity associated with the remaining clock paths of said third set of clock paths.

12. The method as recited in claim 11 wherein configuring said third set of clock paths further includes providing a subgroup of the clock paths associated with said third set of clock paths with a length that differs from the length associated with said remaining clock paths of said third set of clock paths to ensure respective ones of said routed set of clock signals arrive at each of said multiple loads, concurrently.

13. The method as recited in claim 11 wherein configuring said third set of clock paths further includes providing said subgroup of the clock paths associated with said third set of clock paths with a width that differs from the width associated with, said remaining clock paths of said third set of clock paths to ensure respective ones of said routed set of clock signals arrive at each of said multiple loads, concurrently.

14. The method as recited in claim 11 wherein configuring said third set of clock paths further includes forming one or more of the clock paths associated with said third set of clock paths of material having resistivity associated therewith that differs from the resistivity associated with the material from which said remaining clock paths of said third set of clock paths are formed to ensure respective ones of said routed set of clock signals arrive at each of said multiple loads, concurrently.

15. A system to distribute one or more clock signals in digital circuits, said system comprising:

an integrated digital circuit having multiple loads and first and second sets of clock paths and mounted to a substrate, each of said first and second sets of clock paths including one or more clock paths; and a substrate having a third set of clock paths thereon, said integrated digital circuit being mounted to said substrate and said third set of clock paths being in electrical communication with said first and second sets of clock paths, with one or more of the clock paths associated with said third set of clock paths having a resistivity associated therewith that differs from the resistivity associated with remaining clock paths of said third set of clock paths to reduce a difference in propagation delay between said one or more clock signals.

16. The system as recited in claim 15 wherein one or more of the clock paths associated with said third set of clock paths has a length that differs from the length associated with said remaining clock paths of said third set of clock paths.

17. The system as recited in claim 15 wherein a subgroup of the clock paths associated with said third set of clock paths has a width that differs from the width associated with said remaining clock paths of said third set of clock paths.

18. The system as recited in claim 15 wherein one or more of said clock paths associated with said third set of clock paths has a bulk resistance associated therewith that differs from the bulk resistance associated with said remaining clock paths of said third set of clock paths.

19. A system to distribute one or more clock signals in digital circuits, said system comprising:

an integrated digital circuit having multiple loads and first and second sets of clock paths and mounted to a substrate, each of said first and second sets of clock paths including one or more clock paths; and a substrate, said substrate including means, in electrical communication with both said first and second sets of clock paths, for reducing a difference in propagation delay between said one or more clock signals to ensure said one or more clock signals arrive at each of said multiple loads, concurrently.

20. The system as recited in claim 19 wherein said means for reducing said difference in propagation delay includes a third set of clock paths coupled to said substrate, a subgroup of said third set of clock paths having a resistivity associated therewith that differs from the resistivity associated with the remaining clock paths of said third set of clock paths.

* * * * *